Oct. 6, 1931.  A. I. MORTON  1,826,015
FRUIT WASHER
Filed May 26, 1930
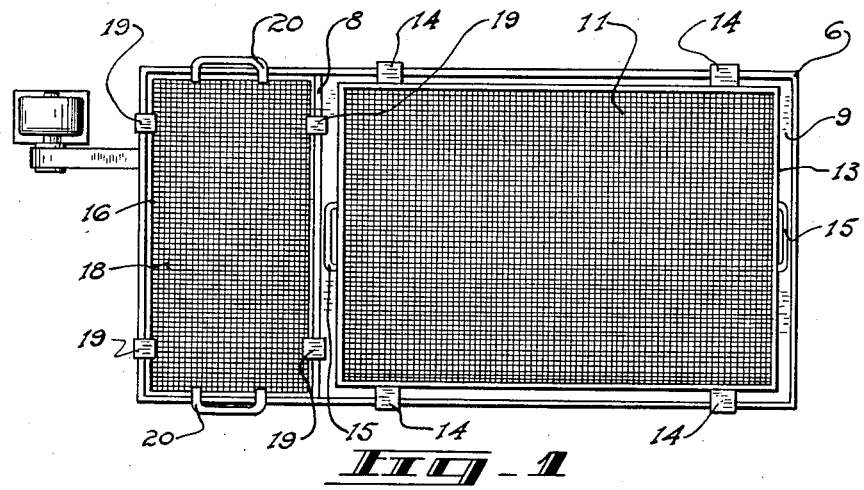
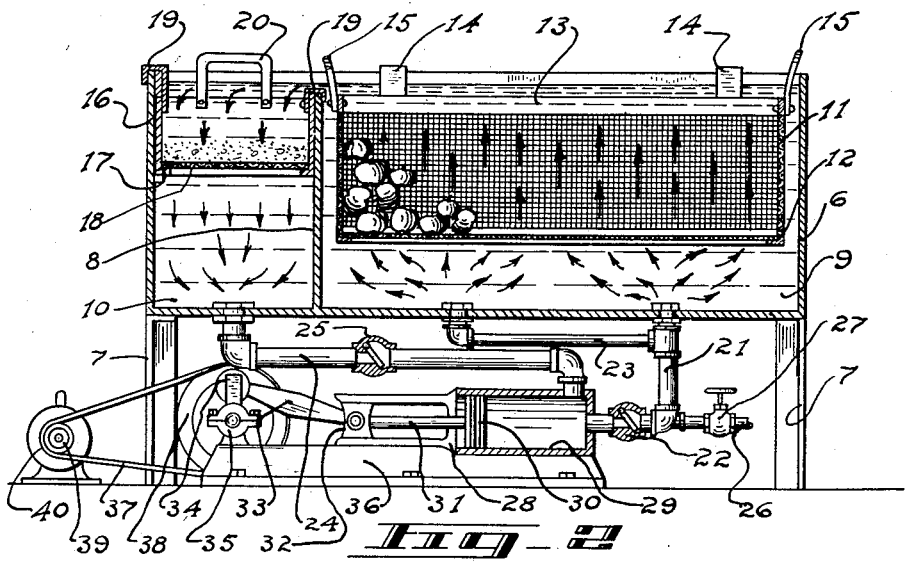
INVENTOR
Alberta Irene Morton
her Attorney Patented Oct. 6, 1931

1,826,015

UNITED STATES PATENT OFFICE

ALBERTA IRENE MORTON, OF NEW YORK, N. Y.

FRUIT WASHER

Application filed May 26, 1930. Serial No. 455,701.

This present invention relates to certain new and useful improvements in a fruit washer.

The primary object of the invention resides in the provision of a fruit washer which is highly efficient and effective in operation as well as simple and inexpensive in construction.

The invention has for another object the provision of a fruit washer of the character stated which will thoroughly clean the fruit and separate therefrom automatically all dirt, leaves, bugs, twigs and other foreign substances.

The invention has for a further object the provision of a fruit washer of the character stated which causes a slight agitation and a separation of the fruit in the washer fruit tray and separation from the fruit of all dirt, and other foreign substances such as twigs, leaves, bugs etc., by a constant circulation of water or other cleansing fluid through the washer fruit tray.

The invention has for a further object the provision of a fruit washer of the character stated in which the fruit is agitated and cleansed in a fruit tray suspended in water or other cleansing fluid and all substances separated from the fruit thrown off of the surface of the fluid above the fruit tray into a waste tray or trap removably supported in the fluid vat or tank.

The invention has for a still further object the provision of a fruit washer of the character stated in which a constant circulation of the washing fluid through the fruit tray is assured to agitate the fruit in said fruit tray and carry all foreign substances outwardly through the fruit tray and out of the top thereof to a waste tray or trap during operation of the fruit washer.

The invention has for a still further object the provision of a fruit washer of the character stated in which all of the leaves, twigs and other foreign substances separated from the fruit are forced upwardly in the fruit tray and out of the same to a waste tray or vat through a constant outward circulation of the washing fluid, through the fruit tray.

The invention has for a still further object the provision of a fruit washer of the character stated which is highly efficient in use, of simple and inexpensive construction and may be manufactured at a small cost and retailed at a popular price with good profit, thus providing a commercially attractive proposition.

To the accomplishment of these and related objects as shall become apparent as the description proceeds, my invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure, wherein like characters indicate like parts throughout the several views.

In the drawings:—

Figure 1 is a plan view of the improved fruit washer; and

Figure 2 is a vertical longitudinal section through the same.

Referring more in detail to the drawings, it is to be noted that the rectangular fluid vat or tank 6 rests on corner angular supporting legs 7 or other appropriate supporting means. The fluid tank 6 has a vertical transverse partition 8 near one end extended from the bottom of the fluid tank 6 to a point near the top of the tank 6 to divide said fluid tank 6 into a main compartment 9 and a smaller second compartment 10. Removably suspended in the main compartment 9 is an elongated rectangular fruit tray 11 formed of wire mesh or other reticulated material, the tray being reinforced around its lower edge by an angular metallic strip 12 or the like while another metallic strip 13 extends around the upper edge of the fruit tank 11 to reinforce the same at its upper edge. The fruit tray 11 is removably suspended in the main compartment 9 of the fluid tank 6 by angular out-turned brackets 14 extending upwardly from the reinforcing strip 13 at the upper edge of the fruit tray 11 and adapted for removable engagement over the edges of the fluid tank 6. Appropriate handles 15 are also extended upwardly from the reinforcing strip 13 at the upper edge of the fruit tray 11, preferably at the ends of the fruit tray 11 to serve as means by which the fruit tray 11 may be readily placed in position in the fluid tank 6 or removed therefrom. A waste tray or vat 16 is in a similar manner removably supported in the upper part of the smaller second compartment 10 of the fluid tank 6. This waste vat or tray 16 may be formed of metal with its bottom open and the lower edge of the vat or tray 16 turned inwardly to serve as an inwardly directed annular flange 17 on which the straining bottom 18 of the vat or tray 16 rests so as to permit the washing fluid to readily pass downwardly through the waste vat or tray 16, as will be later clearly understood. This waste vat or tray 16 has upstanding angular brackets 19 at its opposite sides for removable engagement respectively over the upper edge of the partition 8 in the fluid tank 6 and over the opposite end wall of the fluid tank 6. Appropriate upstanding handles 20 are also carried by the waste vat or tray 16, preferably at the ends thereof to serve as means by which the waste vat or tray 16 may be readily placed in position in the compartment 10 of the fluid tank 6 or removed therefrom as desired.

The washing fluid is supplied to the fruit washer through a supply pipe 21 having a one-way valve 22 or other appropriate valve located therein. This water supply pipe 21 has branches 23 extending upwardly through the bottom of the fluid tank 6 so as to assure a constant forcing upwardly of the washing fluid through the fruit tray 11. The fluid level being maintained at a point above the top of the fruit tray 11 within the fluid tank 6 and above the upper edge of the transverse partition 8 in the fluid tank 6, at all times during operation of the fruit washer. A fluid return or discharge pipe 24 extends from the bottom of the auxiliary chamber or compartment 14 of the fluid tank 6 and has a one-way valve 25 located therein. A drain pipe 26 with a control valve 27 therein is also provided and is shown as being connected with the lowermost portion of the fluid supply pipe 21 forwardly of the valve 22. The washing fluid is forced through the supply pipe 21 under pressure and for this purpose a hydraulic pump 28 may be located in a convenient position as under the fluid tank 6, with the fluid supply pipe 21 extending from one end of the pump cylinder 29. In this case, the fluid return pipe 24 is also connected with the side of the hydraulic pump cylinder 29 to return the washing fluid to the pump cylinder 29, from which it is again forced through the fluid supply pipe 21 and upwardly through the main compartment 9 of the fluid tank 6 and upwardly through the fruit trays 11 suspended therein. The pump piston 30 working in the pump cylinder 29 has its piston rod 31 working through the remaining end of the pump cylinder 29 and connected with the slide block 32, to which is also pivoted the pitman rod 33 working on the power crank shaft 34. This crank shaft 34 is rotatable in appropriate bearings 35 carried on the supporting base 36 which also serves as the supporting base for the pump cylinder 29. The crank shaft 34 is driven by appropriate means such as the drive belt 37 working around the belt wheel 38 carried on the crank shaft 34 and around a drive pulley 39 on the power shaft of a motor 40 or the like.

When the hydraulic pump 28 is dispensed with, the fluid supply pipe 21, the fluid return pipe 24 and the drain pipe 26 will all be connected directly with a main source or supply for a cleansing fluid under pressure.

As the construction of the device has thus been described in detail, brief reference is now had to its use and modus operandi: The fruit to be washed is placed in the fruit tray 11 and the latter suspended in the main compartment 9 of the fluid vat or tank 6. The waste trap or tray 16 is also suspended in the transverse smaller compartment 10 of the fluid vat or tank 6. The washing fluid is then permitted to flow under pressure through the fluid supply pipe 21 and its branches 23 into the bottom of the fluid vat or tank 6, forcing a constant outward circulation of the washing fluid through the fruit tray 11, thus compelling a slight agitation and separation of the fruit within the fruit tray 11 and a thorough washing of all of the fruit and separation therefrom of leaves, twigs, bugs and all foreign substances, carrying the foreign substances to the level of the fluid above the fruit tray 11 and over the upper edge of the transverse partition 8, into the waste vat or tray 16. These separated foreign substances remain in the waste vat or tray 16 while the fluid passes downwardly through the straining body 18 of the waste vat or tray 16 and out of the bottom of the smaller compartment 10 of the fluid vat or tank 6, by way of the fluid return pipe 24. Thus, a constant circulation of the washing fluid in this manner is effected and continued during operation of the improved washer. When the return fluid pipe 24 is connected with the hydraulic pump cylinder 29, continued operation of the piston 30 within said cylinder 29 results in continued use of the washing fluid as it returns to the cylinder 29 after passing downwardly through the waste vat or tray 16, then forcing this washing fluid through the fluid supply pipe 21 into the bottom of the main compartment 9 of the fluid vat or tank 6. The circulation and action of the washing fluid in the machine will be the same, regardless of whether the hydraulic pump 28 is employed or other means substituted for supplying a continual flow of washing fluid to the fluid supply pipe 21 under pressure and taking care of the washing fluid as it returns from the machine by way of the fluid return pipe 24. The fruit tray 11 and the waste vat or tray 16 may be readily placed in position or removed as desired. When the machine is not in use, the washing fluid may be readily exhausted from both the compartments 9 and 10 of the fluid vat or tank 6, by opening the valve 27 in the drain pipe 26.

From the foregoing description, taken in connection with the accompanying drawings, it will be manifest that a fruit washer is provided that will fulfill all the necessary requirements of such a device but as many changes could be made in the above description and many apparently widely different embodiments of my invention may be constructed within the scope of the appended claim without departing from the spirit or scope thereof, it is intended that all matters contained in the said accompanying specification and drawings shall be interpreted as illustrative and not in a limited sense.

Having thus described my invention, what I claim as new and desire to secure by Letters Patent is:—

A fruit washer including a fluid tank; supporting means for said fluid tank; a transverse partition in said fluid tank with its upper edge below the upper edge of said fluid tank dividing said fluid tank into a main compartment and a second compartment; a fruit tray removably suspended in said main compartment of the fluid tank; said fruit tray being formed of a reticulated material; a waste gathering tray removably suspended in the said second compartment of the fluid tank and provided with a reticulated bottom; said waste gathering tray being partly supported on said transverse partition; and means for supplying a washing fluid to the bottom of said main compartment of the fluid tank and causing a constant circulation of said washing fluid upwardly through said main compartment and through the fruit tray and drawing the washing fluid downwardly through said waste collecting tray and outwardly through the bottom of the second compartment of said fluid tank to thoroughly agitate and wash the fruit within the fruit tray and separate twigs, leaves, bugs and other foreign substances from said fruit and carry the same out of said fruit tray over the upper edge thereof and over the partition plate into said waste gathering tray.

In testimony whereof I hereunto affix my signature.

ALBERTA IRENE MORTON.